United States Patent [19]
Bertolini

[11] 4,108,326
[45] Aug. 22, 1978

[54] ADAPTER FRAMES TO EXTEND LENGTH OF INTERMODAL CONTAINERS

[75] Inventor: William A. Bertolini, Butler, N.J.

[73] Assignee: Bertolini Engineering Co., Inc., Butler, N.J.

[21] Appl. No.: 809,641

[22] Filed: Jun. 24, 1977

[51] Int. Cl.$^2$ ............................................. B62D 33/08
[52] U.S. Cl. ................................. 220/1.5; 24/221 R; 24/221 K; 52/648; 105/366 R; 105/367; 220/23.4; 296/26; 296/28 K; 296/35 R
[58] Field of Search .............................. 220/1.5, 23.4; 105/366 A, 366 B, 366 C, 366 D, 366 E, 367, 366 R; 296/26, 27, 35 R, 28 K; 403/387, 13, 14; 292/113, DIG. 49, DIG. 39, DIG. 40; 24/221 RC, 221 K, 221 A, 221 R; 52/726, 643, 637, 645, 584, 585, 648, 146

[56] References Cited

U.S. PATENT DOCUMENTS

| 137,426 | 4/1873 | Eichenberger et al. ............... 151/59 |
| 821,497 | 5/1906 | Huntley ................................ 151/59 |
| 1,771,184 | 7/1930 | McLaughlin ................ 292/DIG. 39 |
| 2,581,089 | 1/1952 | Evans et al. .......................... 24/221 A |
| 3,011,586 | 12/1961 | Harvey, Jr. ............................ 52/637 |
| 3,061,134 | 10/1962 | Fesmire et al. ..................... 220/23.4 |
| 3,073,466 | 1/1963 | Greer et al. ......................... 220/23.4 |
| 3,092,282 | 6/1963 | Tantlinger et al. ................. 220/23.4 |
| 3,162,145 | 12/1964 | Franklin et al. ..................... 105/367 |
| 3,162,320 | 12/1964 | Hitch et al. .......................... 220/1.5 |
| 3,172,566 | 3/1965 | Mullin et al. ........................... 220/12 |
| 3,386,600 | 6/1968 | Betjemann ............................ 220/1.5 |
| 3,410,227 | 11/1968 | Gutridge .............................. 105/366 C |
| 3,459,326 | 8/1969 | Betjemann ............................ 220/1.5 |
| 3,612,466 | 10/1971 | Arnold ................................ 296/35 A |
| 3,616,959 | 11/1971 | Remesy et al. ....................... 220/12 |
| 3,737,135 | 6/1973 | Bertolini ........................ 24/221 RC |
| 3,823,522 | 7/1974 | Juveit et al. ........................... 52/645 |
| 3,992,050 | 11/1976 | Backteman ....................... 105/366 B |

FOREIGN PATENT DOCUMENTS

| 1,024,414 | 4/1953 | France ..................................... 105/367 |
| 462,361 | 6/1928 | Fed. Rep. of Germany .......... 105/367 |
| 329,269 | 9/1935 | Italy ......................................... 52/645 |
| 1,247,349 | 9/1971 | United Kingdom ................... 220/1.5 |

*Primary Examiner*—William Price
*Assistant Examiner*—Allan N. Shoap
*Attorney, Agent, or Firm*—Max R. Millman

[57] ABSTRACT

Portable trussed adapter frames are removably coupled to the ends of a standard 20 ft. intermodal container to extend it to an effective length of 40 ft. whereby the container can be carried on a skeletal chassis without the necessity of providing separate specialized chassis equipment for 20 ft. containers carrying dry freight or liquid commodities.

9 Claims, 10 Drawing Figures

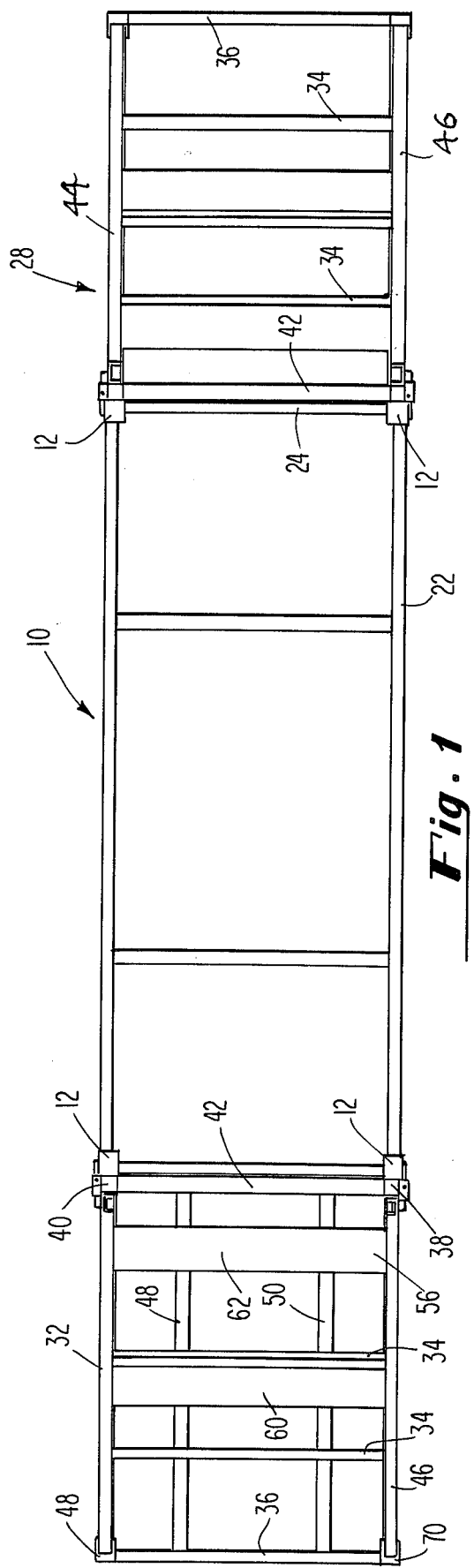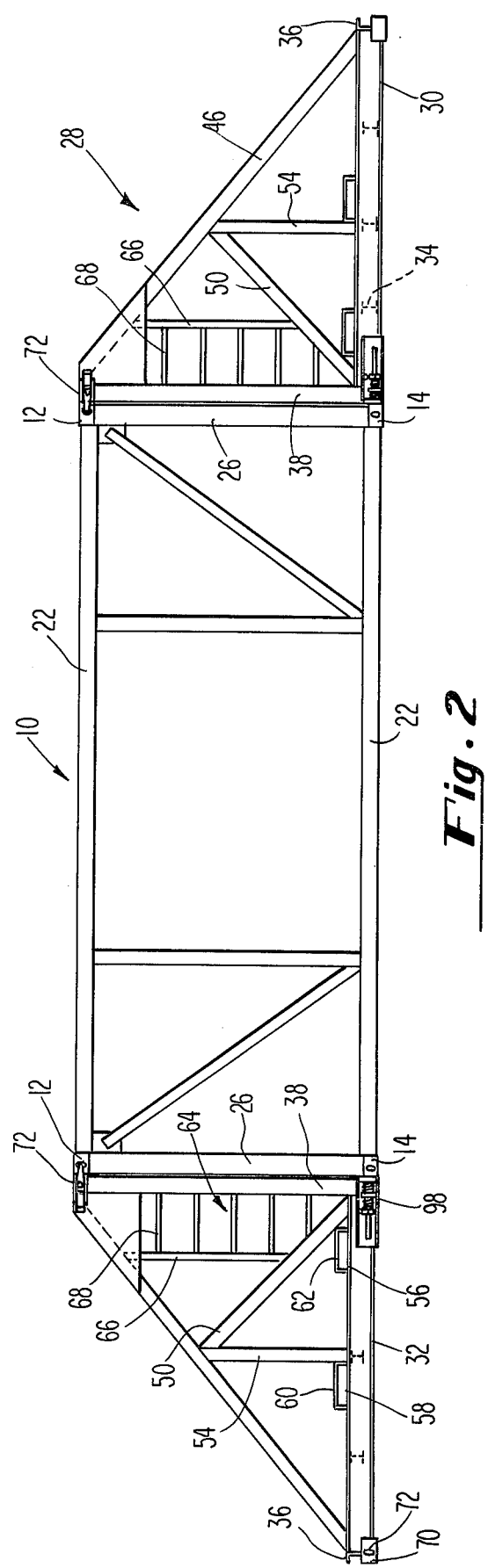

ADAPTER FRAMES TO EXTEND LENGTH OF INTERMODAL CONTAINERS

This invention relates to intermodal containers and, more specifically, adapter frames to extend the length thereof.

The sizes and dimensions of intermodal containers have been standardized over the years. I.S.O. containers come in lengths of 10, 20, 30 and 40 ft., the 20 and 40 ft. being most common, all have standardized corner fittings, are all 8 ft. wide and are either 8.0 ft. or 8 ft. 6 in. high. Standard gross weight ratings are 20 long tons for the 20 ft. container and 30 long tons for the 40 ft. container. Support chassis equipment have been designed around the 20 ft. and 40 ft. containers.

Because of bridge requirements in some of the United States, a 20 ft. chassis is lengthened to 23 ½ ft. to provide additional over-the-road capability. Currently, there is a trend to carry liquid commodities in 20 ft. tank containers with capacity ratings of 24 long tons. The United States road laws and regulations require that a specialized chassis 38 ft. or more long with heavy main rails be used to support the concentrated load of a 20 ft. tank in the center of the chassis. Not only is such a chassis expensive, it is also limited as a carrier for a dry freight container since this requires a loading platform at its rear.

The primary object of this invention is therefore to provide portable frame structures and means to removably couple them to the ends of a 20 ft. container to increase its effective length to 40 ft. to allow it to be carried on a 40 ft. skeletal chassis thereby eliminating separate specialized chassis equipment to carry either a 20 ft. dry freight container or a 20 ft. tank container for liquid commodities with capacities of more than 20 tons.

Another object is to provide portable adapter frames of the character described which are of truss construction and include means removably coupling them to the ends of the container whereby simple and inexpensive equipment is employed to convert a 20 ft. container to a structurally sound 40 ft. length for mounting on a 40 ft. chassis.

Another object of the invention is to provide portable triangular shaped, trussed adapter frames which are readily and easily coupled removably to the top and bottom corner castings of the container whereby compression forces are transmitted through the top connection members and tension and shear forces through the bottom connection members of the adapter frames.

Another object of the invention is to provide portable trussed substantially triangular adapter frames removably coupled to the ends of the container via their top and bottom corner castings having transverse members adapted to bear on a support chassis and so configurated at its front to allow the extended container to rest securely on either a gooseneck or straight frame chassis.

Yet another object of the invention is to provide portable adapter frames of the character described in which their heights are vertically adjustable to allow coupling to the top corner castings of higher containers, such as 8 ½ ft. instead of 8 ft. containers, both of which are I.S.O. standard heights, These and other objects of the invention will become more apparent as the following description proceeds in conjunction with the accompanying drawings wherein:

FIG. 1 is a top plan view of the adapter frames shown coupled to the ends of a standard I.S.O. container;

FIG. 2 is a side elevational view thereof;

Specific reference is now made to the drawings in which similar reference characters are used for corresponding elements throughout.

Figure 3:
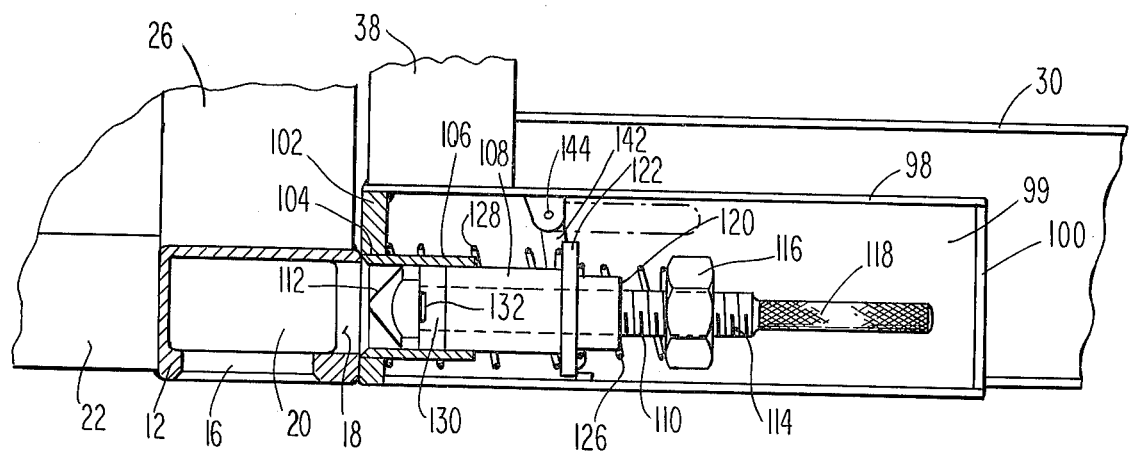
FIG. 3 is a longitudinal sectional view through a lower corner of the adapter frame showing the lower coupler in its uncoupled or retracted position.

Indicated generally at 10 is a conventional 20 ft. tank type container having the usual side, end, botton and top structurals having standard I.S.O. corner castings 12 and 14 at the top and bottom respectively, each including side and end substantially oval standard openings 16 and 18 communicating with a recess or cavity 20 therein, the corner castings being interconnected by longitudinal and transverse members 22 and 24 and vertical corner posts 26 on whose ends the corner is secured, all as is well known in the art.

The frames of the instant invention are generally indicated at 28 and are portable and adapted to be coupled to the ends of the container 10 to extend its length to 40 ft. for mounting on an appropriate chassis so that the container can legally carry the maximum allowable dry freight or liquid commodities. Since the frames are the same, a description of one and its coupling means will suffice.

The frame 28 is substantially right-triangular and includes a pair of longitudinal side channels 30 and 32 about 10 ft. long and transversely spaced a distance equal to the width of the container (about 8 ft. standard) so that the channels 30 and 32 are substantially coextensive with the lower longitudinal members of the container. Connecting the longitudinal channels are transverse members 34 and an end sill 36, preferably I-beams.

Vertical tubular members 38 and 40 are welded or otherwise fixed to the inner ends of the longitudinal channels 30 and 32, that is, the end of the frame opposite the end sill 36, the vertical members being substantially coextensive with the container corner posts 26 and corner fittings 12 and 14 and adapted to bear against them when the frame is coupled to the container. Upper and lower transverse members 42 interconnect the vertical frame members 38 and 40.

Diagonal truss members 44 and 46, preferably channels, interconnect the end sill 36 and the tops of the vertical frame members 38 and 40. Additional diagonal truss members 50, preferably channel, connect the truss members 44 and 46 intermediate their ends with the lower ends of the vertical frame members 38 and 40 and further vertical members 52 and 54, also preferably channel, interconnect the truss members 44 and 46 with the lower ends of the vertical members 38 and 40 at the junctures of the diagonal truss members 44, 48 and 46, 50 are seen clearly in FIGS. 1 and 2.

Longitudinally spaced, transverse members 56 and 58, preferably hollow rectangular beams, are welded upon the longitudinal frame members 30 and 32 and provide longitudinally spaced flat top surfaces 60 and 62 to provide pockets for handling the adapter frames with forklift trucks. Adjacent the vertical frame member 38 and 40, ladders 64 are incorporated in the frames to allow one to reach the top thereof for indexing and coupling the frame to the top corner castings, the ladder including a vertical bar 66 interconnecting the diagonal truss members 46 and 50 and parallel to a vertical frame member and vertically spaced rungs 68 interconnecting the rod 66 and the corresponding vertical frame member 38 and 40.

The ends of the end sill 36 and longitudinal side members 30 and 32 are connected by standard I.S.O. corner fittings 70 with standard apertures 72 therein to assist in lifting and transporting the frame.

Figure 8:
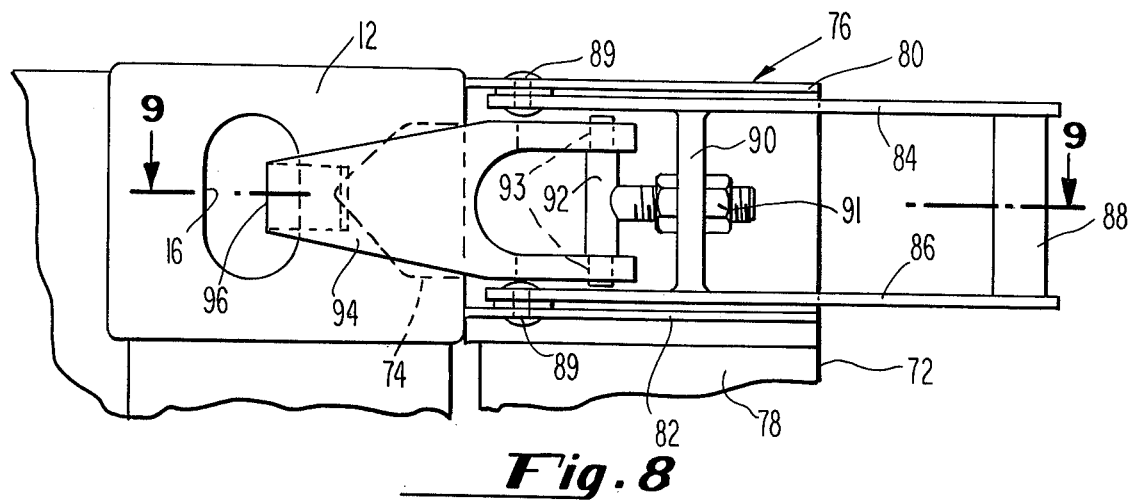
FIG. 8 is an enlarged side elevational view of a top corner of the frame.

The upper ends of the vertical frame members 38 and 40 each contain corner members or cubicle butting structures 72 from which protrude longitudinal tapered indexing fingers 74 adapted to enter the end openings 18 in the upper corner castings 12 of the container. To removably secure the frame to the upper corner castings 12 of the container, over-center latches are provided at the upper corner members 72 which are adapted to engage the upper corner castings of the container through their side holes or openings 16. This over-center latch mechanism includes a channel member 76, see FIGS. 8 and 9, welded to one side face 78 of each upper frame corner member 72. Between the flanges 80 and 82 of the channel member is positioned a pair of interconnected plates 84 and 86 having a handle 88 at its outer end and which are hingedly secured as at 89 to the flanges about vertical axes. A bar 90 is secured between the plates 84 and 86 and to which is secured as at 91 a vertical rod 92 which is vertically pivoted as at 93 to the bifurcations of a hook member 94. This latch mechanism operates like a conventional over-center luggage latch, that is, when the handle is rotated to the position to the left of the drawings and extends at an angle to the face 78 of the upper frame corner 72, the hook member is unlatched or free. When one desires to effect latching, the hook end 96 of the hook member 94 is inserted in the side hole 16 of the container corner casting and the handle is rotated to the right until the plates 84 and 86 underlie and extend along the flanges 80 and 82 whereupon the hook 96 tightens around the edge of the hole 16.

To complete the attachment of the frame to the container, a pair of lower coupling mechanisms in the form of twist locks are provided as shown in FIGS. 3-6 at the lower corners of the frame and, here again, since each coupling mechanism is the same, only one will be described.

Each longitudinal side member 30 and 32 has welded thereto a longitudinal channel member 98 which is open at its side 99, the front end having an end plate 102 with a circular opening 104 therein dimensioned to conform to maximum dimension of the end hole 18 of the lower corner container casting 14, the rear end having end plate 100. Welded to the inside of the end plate 102 at its opening 104 is a tubular socket member 106. A collar 108 slides in the socket. A coupling pin is provided which includes a rod or shaft 110 which slides through the collar 108 and outside of the front end of the collar, the shaft carries a tapered head 112 which conforms to the shape of the end hole 18 of the corner container casting. Adjacent its rear, the shaft 110 is threaded as at 114 to receive a nut 116 beyond which the shaft includes a reduced knurled portion 118 whereby the hand can be extended through the open end 100 of the sleeve 98 so that the fingers can grasp the knurled portion 118 to push and rotate the same.

Adjacent to but spaced somewhat from the rear edge 120 of the collar 108 the latter slidably mounts an integral flange 122 whose inboard side is flattened as at 124 to prevent relative rotation without restricting the sliding action of the flange, and a spring 126 is disposed between the flange 122 and nut 116 and around the collar and the shaft normally urging the nut and the coupler to its retracted position as shown in FIG. 3. A further spring 128 is wound about the socket 106 and the collar 108 and is interposed between the end plate 102 and the slidable flange 122 normally urging the latter towards the nut in the retracted position of the coupler.

At its front end the collar 108 is milled out to provide bosses or flat portions 130 on both sides thereof which will mate with the end hole 18 of the container corner casting and allow the collar and the coupling head to enter the casting in the coupling position, the end face 132 of the portion 130 being grooved as at 134 in two positions to act as a detent for the back face of the twist lock head 112.

Figure 9:
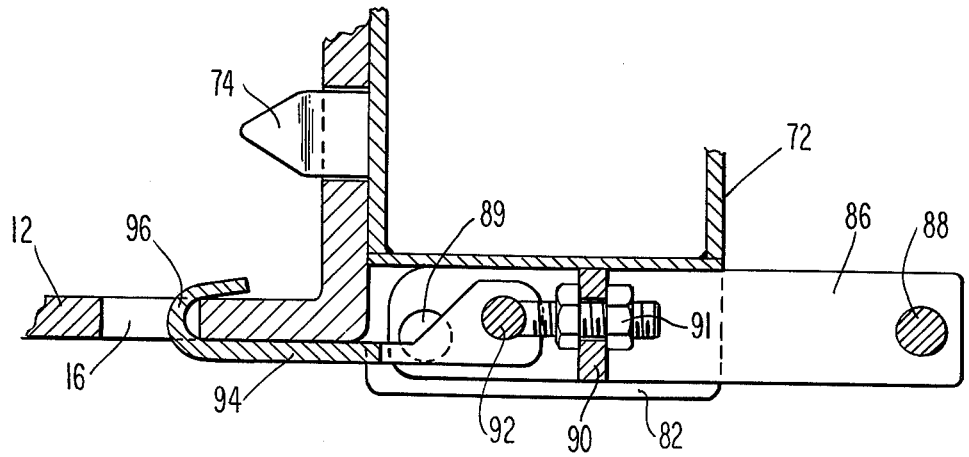
FIG. 9 is a horizontal sectional view taken on the line 9—9 of FIG. 8.
Figure 10:
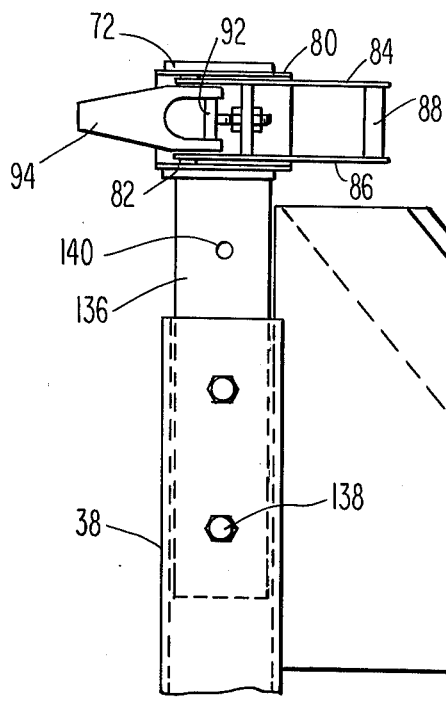
FIG. 10 is a partial side elevational view of a modified form of a vertical component of the adapter frame.

Should it be necessary to fit the end frames 28 to containers 8 ft. 6 in. high, the vertical frame portions 38, 42 can be made adjustable by having each of them receive an inner telescoping member 136 (which mounts the index 74 and side latch hook) which can be held in adjusted vertical positions by appropriate bolts 138 which are secured in selected vertically spaced alignable holes 140 in the telescoping members 38 and 136, as seen in FIG. 9.

In use, the container 10 is placed on a smooth level area, preferably on a rack. Using a fork lift or other suitable material handling device, the two end frames 28 are placed on both ends of the container to align with the container corner casting end holes 18. The two frames are budged into close proximity of the container and, after climbing up the ladders 64, and adjusting the height of the vertical frame members if necessary, the protuberances 74 are indexed into the end openings 18 of the upper container corner castings 12 and the hooks 96 are inserted in the side openings 16 of those upper container corner castings and latched therein by pushing the handle 88 to a position against the sides of the frames.

Figure 4:
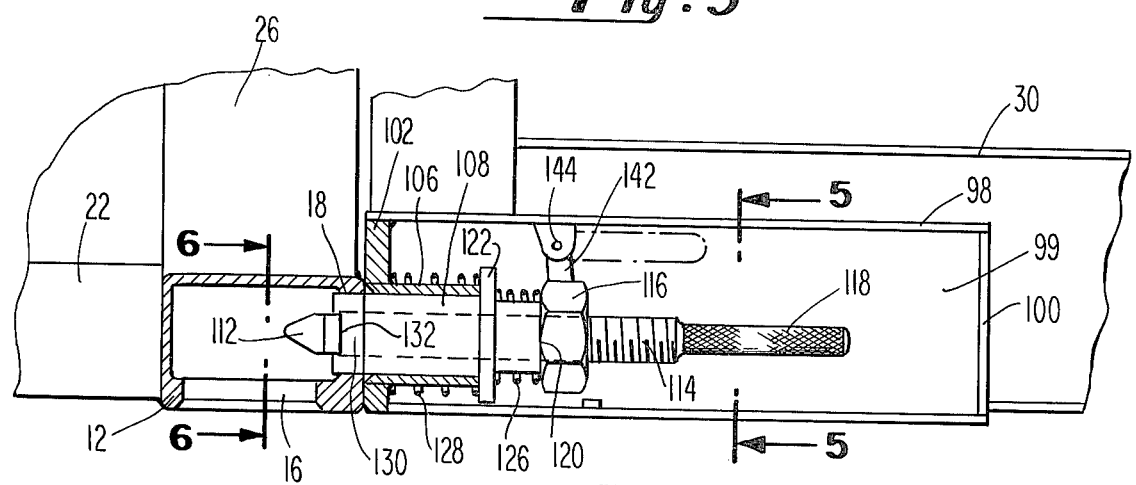
FIG. 4 is a view similar to FIG. 3 showing the lower coupler in its position coupling the frame to the container.
Figure 6:
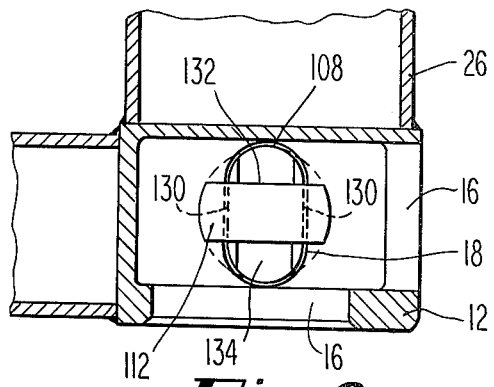
FIG. 6 is a sectional view taken on the line 6—6 of FIG. 4.
Figure 5:
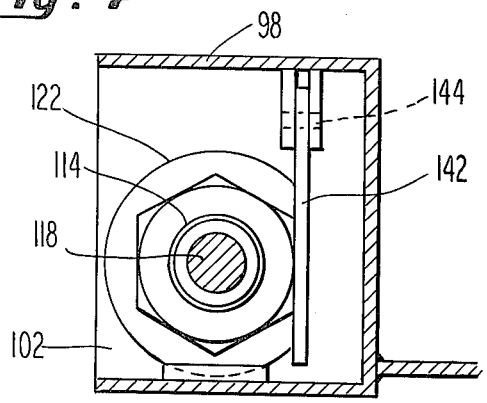
FIG. 5 is a sectional view taken on the line 5—5 of FIG. 4.
Figure 7:
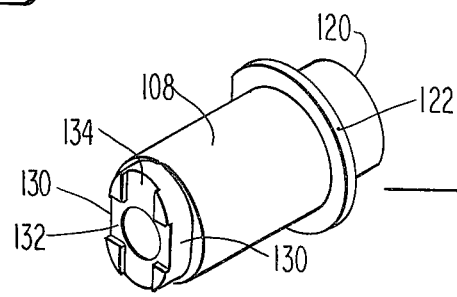
FIG. 7 is a perspective view of the collar used in the coupler shown in FIGS. 3–6.

Then descending the ladders, each knurled portion 118 of the lower twist lock is grasped and pushed inwardly. This compresses the smaller spring 126 which then compresses the larger spring 128, both of which springs are relatively weak. This causes the flange 22 to bear on the socket 106 urging its portion 130 into the hole 18 while the head 112 passes through the hole with which it has been aligned. When the head clears the hole and is well in the cavity 20 of the corner casing, the shaft 110 is twisted so that the head 112 traverses the narrow dimension of the hole 18 for the coupling position. In this position the larger spring 106 and the head 112 will engage in the 90° detent 132, 134 on the end face of the portion 130 of the collar 108. Then the nut 116 is loaded into the secure position against the end 120 of the collar. A lever 142 is pivoted as at 144 to a bracket in the sleeve 98 and, when it is dropped, as seen in FIG. 4, it engages the flat faces of the nut 116 and prevents its unwinding in the secure position.

While preferred embodiments have been shown and described herein, skilled artisans may make variations without departing from the spirit of the invention.

What is claimed is:

1. A frame adapted to extend a container at one or both of its ends comprised of a substantially right-triangular member including spaced horizontal longitudinally extending members, spaced transverse members connecting them, transversely spaced vertical members secured to said longitudinal members and forming corners therewith, said vertical members including upper ends opposite said corners, diagonal brace members interconnecting said horizontal and vertical members, indexing protuberances extending horizontally from said upper ends of said vertical members, latching means carried by said upper ends of said vertical members and releasable twist lock means carried by said frame at said corners thereof.

2. The frame of claim 1 wherein said vertical members include means to retain their heights in adjusted positions.

3. The frame of claim 1 and ladders connected to each of said frames whereby one may ascend said frame to reach and operate said indexing protuberances and latching means at the upper ends of said vertical members.

4. In combination with a substantially rectangular container having top, bottom, side and end walls interconnected by vertical corner posts and upper and lower corner members at the ends of said posts; portable means to increase the effective length of the container comprised of substantially right-triangular open trussed end frames each having spaced interconnected vertical and horizontal members, said vertical frame members being substantially as high as said vertical container corner posts and adapted to abut said vertical container corner posts at one end of said container, said vertical frame members having upper free ends, said horizontal frame members being connected to said vertical frame members to form frame corner members adapted to abut said lower container corner members, first-named means carried by said vertical frame members at their upper free ends to removably attach them to said upper container corner members and second-named means carried by each frame to removably couple said frame corner members to said lower container corner members.

5. The combination of claim 4 wherein said upper corner members of said container each include a cavity and a side opening therein communicating with the cavity, said first-named means including an over-center latch member including a hook adapted to enter said side opening, said latch member being mounted for movement from an inoperative position in which said hook is not engaged in said side opening to an operative position in which said hook is engaged in said side opening.

6. The combination of claim 5 wherein each of said upper corner members of said containers also includes an end opening and a horizontal protuberance extending from said upper free end of said vertical member of said frame and adapted to enter said end opening to index said frame on said container and align said horizontal member of said frame with said bottom wall of said container.

7. The combination of claim 4 wherein each lower corner member of said container includes a cavity therein and an end opening in said corner member communicative with said cavity, said second-named means including a twist lock having a shaft and a head thereon, said head being adapted for insertion into said lower continuous corner member through said end opening thereon and adapted to be turned to a position to traverse said end opening and thereby couple the corner to said frame to said lower corner member of said container.

8. The combination of claim 7 wherein said twist lock includes means to slidably and rotatably mount said shaft on said frame, resilient means normally urging said head and shaft to a retracted uncoupled position and means to releasably lock said head in its coupled position in said lower corner member after overcoming said resilient means.

9. The combination of claim 4 wherein the length of each of said frames is substantially half as long as said container, said container being about 20 ft. long and the resultant structure including said frames coupled to the ends of said container being about 40 ft. long.

* * * * *

UNITED STATES PATENT OFFICE
CERTIFICATE OF CORRECTION

Patent No. 4,108,326          Dated August 22, 1978

Inventor(s) William A. Bertolini

It is certified that error appears in the above-identified patent and that said Letters Patent are hereby corrected as shown below:

Col. 2, line 26, "botton" should be ---bottom---.

Col. 6, line 29, "continuous" should be ---container---.

Col. 6, line 30, "thereon" should be ---thereof---.

Signed and Sealed this

Twentieth Day of February 1979

[SEAL]

Attest:

RUTH C. MASON  
Attesting Officer

DONALD W. BANNER  
Commissioner of Patents and Trademarks